No. 8,579.   PATENTED DEC. 9, 1851.

J. ERICSSON.
ROTARY FLUID METER.

UNITED STATES PATENT OFFICE.

JOHN ERICSSON, OF NEW YORK, N. Y.

WATER-METER.

Specification of Letters Patent No. 8,579, dated December 9, 1851.

*To all whom it may concern:*

Be it known that I, JOHN ERICSSON, of the city, county, and State of New York, have invented a new and useful Rotary Fuid-Meter, and that the following is a full, clear, and exact description thereof, reference being had to the accompanying drawings, making part of this specification, in which—

Figure 1:
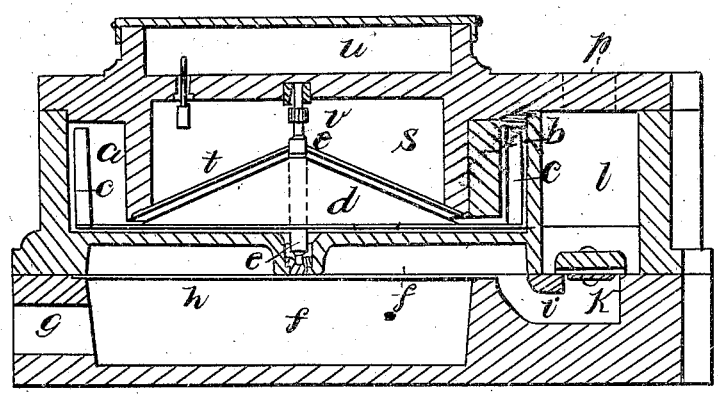
Figure 2:
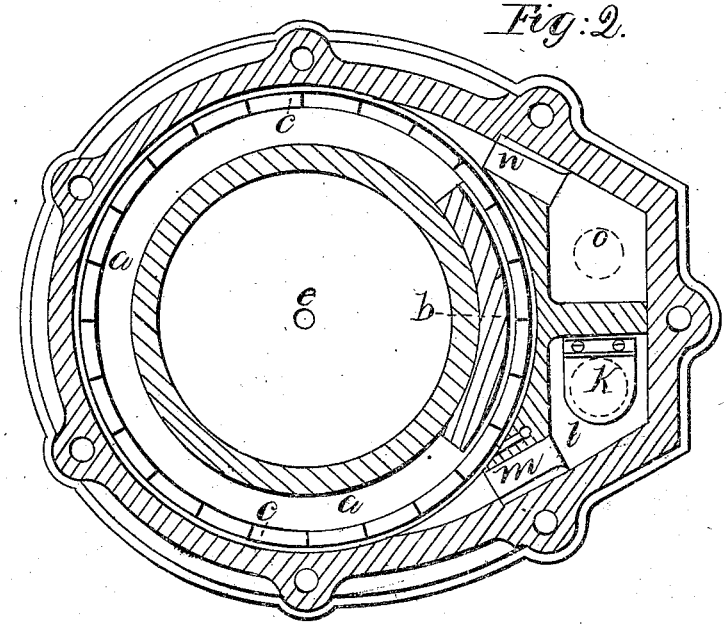

Figure 1, represents a sectional elevation, and Fig. 2, a sectional plan of this meter the principle of which is that of measuring fluids by the velocity with which they pass through apertures of definite dimensions.

The same letters indicate like parts in both figures.

The leading feature of the machine consists in this—that the fluid to be measured is made to enter and leave a circular channel through apertures of precisely equal dimensions, and that in passing through it imparts motion to a paddle wheel which moves freely in said channel, this latter being contracted for about one-fifth of the circle. The contracted part of the channel is made only sufficiently large for the paddles to pass without touching, while the opposite portion is of such dimensions that its sectional area shall be precisely equal to the area of the contraction added to the area of either of the apertures through which the fluid enters and leaves.

$a$, $a$, the circular channel, and $b$, the contracted portion thereof; $c$, $c$, the paddle wheel composed of a flat circular disk, supported by a cone $d$, and revolving on a vertical spindle $e$, $e$; $f$, $f$, cavities formed in the base of the machine, into which the fluid first enters through the opening $g$; $h$, diaphragm of perforated tin plates, separating the upper and lower portion of the cavity $f$, $f$; $i$, passage leading under a self acting valve $k$; $l$, chamber containing said valve; $m$, the aperture through which the fluid enters the circular chamber, and $n$, the aperture through which it leaves; $o$, exit chamber, and $p$, exit pipe for the measured fluid; $q$, pipe communicating directly with the cavity $f$; $r$, a small tangential opening communicating with $q$, and situated near the middle of the paddles; $s$, cavity formed in the central part of the machine, closed below by a thin partition $t$, through the center of which the spindle $e$, $e$, works freely; $u$, the box for containing an ordinary register; $v$, pinion on the vertical spindle, for communicating motion to the register.

The machine being supposed to be charged, it will be evident that as soon as the fluid enters the cavity $f$, it will flow into the circular channel through $q$ and $r$ before the valve $k$ opens, and that if a very small quantity only be admitted the valve will not open at all. It will also be evident that, if the jet produced by the fluid entering through $r$ be powerful enough to overcome the friction of the journals of the wheel, this will commence revolving.

The foregoing description being deemed sufficient to show the mechanical structure and operation of the machine, its properties and more particularly its accuracy as an instrument of admeasurement, will next be considered.

Supposing a full current to be passing through, and the wheel revolving, the most striking feature of the operation, is the continuous rotation of a definite quantity of fluid through the contracted channel $b$, and its eccentric course between leaving and entering the same. The next marked feature, is the definiteness of volume passing $a$ $a$. The areas of $m$ and $n$ being alike and the area of $a$ being equal to $m$ and $b$ together, the volume passing $a$ $a$ will be equal to the quantity entering at $m$ added to the quantity returned through $b$; and lastly the quantity leaving $n$ will be equal to the quantity passing $a$ $a$ minus the quantity returned through $b$. The third important point is the space passed through in any given time by the paddles, compared to the speed of the current leaving $n$. The retardation of the wheel by friction in the journals is so small, when full quantity passes through the meter, as not to be at all important. Taking this small amount of friction into account, it will be found that the outer portion of the paddles will move faster than the current entering and leaving, and that the inner portion will move slower; for the current at $m$ will partially enter the wheel, and partially flow through it, and at $n$ it will partially pass out of the wheel and partially through it a second time.

That an impetus will be given to the wheel, when the fluid passes into and through it, is sufficiently evident without demonstration, and likewise that a retardation will take place when the fluid passes out of and through it; accordingly neither the inside nor the outside circle described by the paddles will indicate the velocity of the current at *n*. Careful computation might define the mean circle, but the result would not be worth the trouble. The indication of the register by running a definite quantity through, supersedes the necessity of so laborious an operation, and the mean thus ascertained will become a standard. The small jet *r* is also an important point in the combination of the machine. It might be supposed that in passing small quantities through the meter, the definite friction of the journals of the wheel, would cause a disproportionate retardation, productive of erroneous indication. This is entirely obviated by the valve *k* and small jet *r*. The meter will indicate accurately all quantities sufficient to supply this small jet, under the pressure produced by the load on the valve. The capability to measure smaller quantities than that would not much enhance the value of the machine for practical purposes. But the object of the small jet is not only to effect an indication of small quantities; it also gives vitality to the machine, by its ample power to overcome friction and cause motion. The consideration of the peculiar action of this jet now leads to the consideration of the essence of the construction of this meter. It would be reasonable to suppose that if a sufficient force were given to this jet to insure positive action of the wheels, an undue speed, accompanied by erroneous indications, would be the result. Not so. The area of the jet is less than $\frac{1}{1000}$ part of the area of all the paddles. The counteracting resistance which they offer is accordingly so great, that until the whole mass of fluid in the circular channel is put in motion, the speed of the wheel will be scarcely observable; now the whole mass cannot move without producing a current through *b* and *n* for if *n* be closed, the jet at *r* ceases and with it all motion. Again it may be objected that the inertia of the wheel will permit a small quantity to pass through before the register tells. True, but the momentum will on the other hand, keep the register in motion, after the entrance of the fluid shall have been shut off.

What I claim as my invention and desire to secure by Letters Patent, is—

1. The uniform circular channel *a a* in combination with the contracted channel *b*.

2. I claim the rotating paddle wheel having paddles projecting into, and working in the said uniform and contracted channels.

3. I claim the apertures *m* and *n* proportioned and formed as described.

4. I claim the pipe *q* with its jet *r* for giving motion to the paddle wheel before the fluid enters through the aperture *m*.

5. I claim the valve *k* by which any desirable power jet may be obtained before any fluid enters through *m*.

J. ERICSSON.

Witnesses:
E. W. STOUGHTON,
A. T. BROWN.